(12) United States Patent
Hanson et al.

(10) Patent No.: US 11,325,664 B2
(45) Date of Patent: May 10, 2022

(54) RECONFIGURABLE BED RACK SYSTEM AND METHOD

(71) Applicant: Overkill Motorsports, Inc., Dallas, TX (US)

(72) Inventors: Mark Hanson, Dallas, TX (US); Christopher Faustmann, Dallas, TX (US)

(73) Assignee: Overkill Motorsports, Inc., Dallas, TX (US)

( * ) Notice: Subject to any disclaimer, the term of this patent is extended or adjusted under 35 U.S.C. 154(b) by 0 days.

(21) Appl. No.: 16/903,671

(22) Filed: Jun. 17, 2020

(65) Prior Publication Data

US 2021/0078645 A1 Mar. 18, 2021

Related U.S. Application Data

(60) Provisional application No. 62/902,202, filed on Sep. 18, 2019.

(51) Int. Cl.
| | |
|---|---|
| *B62D 33/02* | (2006.01) |
| *B60R 9/00* | (2006.01) |
| *B62D 43/00* | (2006.01) |
| *B62D 43/06* | (2006.01) |

(52) U.S. Cl.
CPC ............. *B62D 43/002* (2013.01); *B60R 9/00* (2013.01); *B62D 33/0207* (2013.01); *B62D 43/06* (2013.01)

(58) Field of Classification Search
CPC ................ B62D 33/027; B62D 43/002; B62D 33/0207; B60R 9/00

USPC .............................. 296/3; 224/402–405, 413
See application file for complete search history.

(56) References Cited

U.S. PATENT DOCUMENTS

| | | | |
|---|---|---|---|
| 3,952,894 A | 4/1976 | Mendez | |
| 5,037,152 A * | 8/1991 | Hendricks | ................. B60R 9/00 |
| | | | 296/3 |
| 6,347,731 B1 | 2/2002 | Burger | |
| 6,971,563 B2 | 12/2005 | Levi | |
| 7,100,956 B1 * | 9/2006 | Wilkins | .................... B60P 3/40 |
| | | | 296/37.2 |
| 7,198,185 B2 * | 4/2007 | Storer | ....................... B60R 9/00 |
| | | | 224/403 |

(Continued)

OTHER PUBLICATIONS

International Search Report and Written Opinion regarding PCT/US 2020/051473, dated Dec. 22, 2020.

*Primary Examiner* — Dennis H Pedder
(74) *Attorney, Agent, or Firm* — Polsinelli PC

(57) ABSTRACT

A reconfigurable bed rack system and methods of manufacture and use that is dynamic, adaptable, lightweight, and easy to install are provided. The bed rack system may include a plurality of U-shaped modular telescoping support structures that allow for a height adjustment to the rack without uninstalling the rack from the truck bed. Through the telescoping feature of the U-shaped support structures, a height dimension of the bed rack system may be increased or decreased. One or more side and/or upper rails may extend between the plurality of U-shaped modular telescoping supports for attaching one or more mounting brackets to secure equipment, tools and/or supplies to the bed rack system. The rack system may also include a tire hoist bracket assembly including a hoisting system to store a spare tire against an upper, inner surface of the rack system.

15 Claims, 18 Drawing Sheets

(56) References Cited

U.S. PATENT DOCUMENTS

| | | | | |
|---|---|---|---|---|
| 7,322,499 | B2* | 1/2008 | Storer | B60R 9/00 |
| | | | | 224/403 |
| 8,281,969 | B2* | 10/2012 | Schmidlkofer | B60R 3/00 |
| | | | | 224/543 |
| 9,718,505 | B2* | 8/2017 | Goss | B62D 43/002 |
| D814,389 | S * | 4/2018 | Walker | D12/412 |
| 10,207,650 | B1 | 2/2019 | Banegas | |
| 10,442,474 | B2* | 10/2019 | Hinz | B62D 33/0273 |
| 2013/0229025 | A1* | 9/2013 | Johnasen | B60R 9/045 |
| | | | | 296/3 |

* cited by examiner

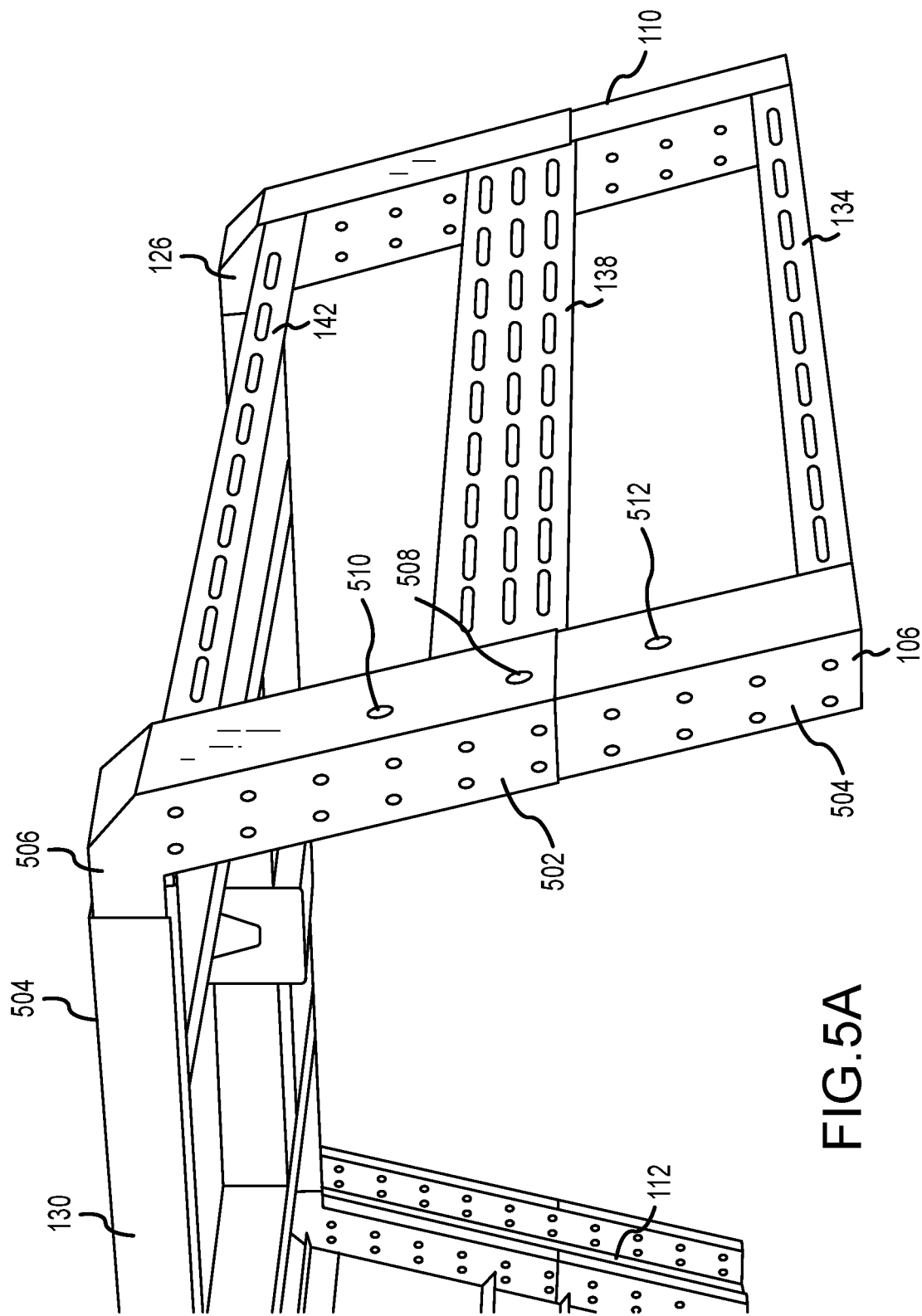

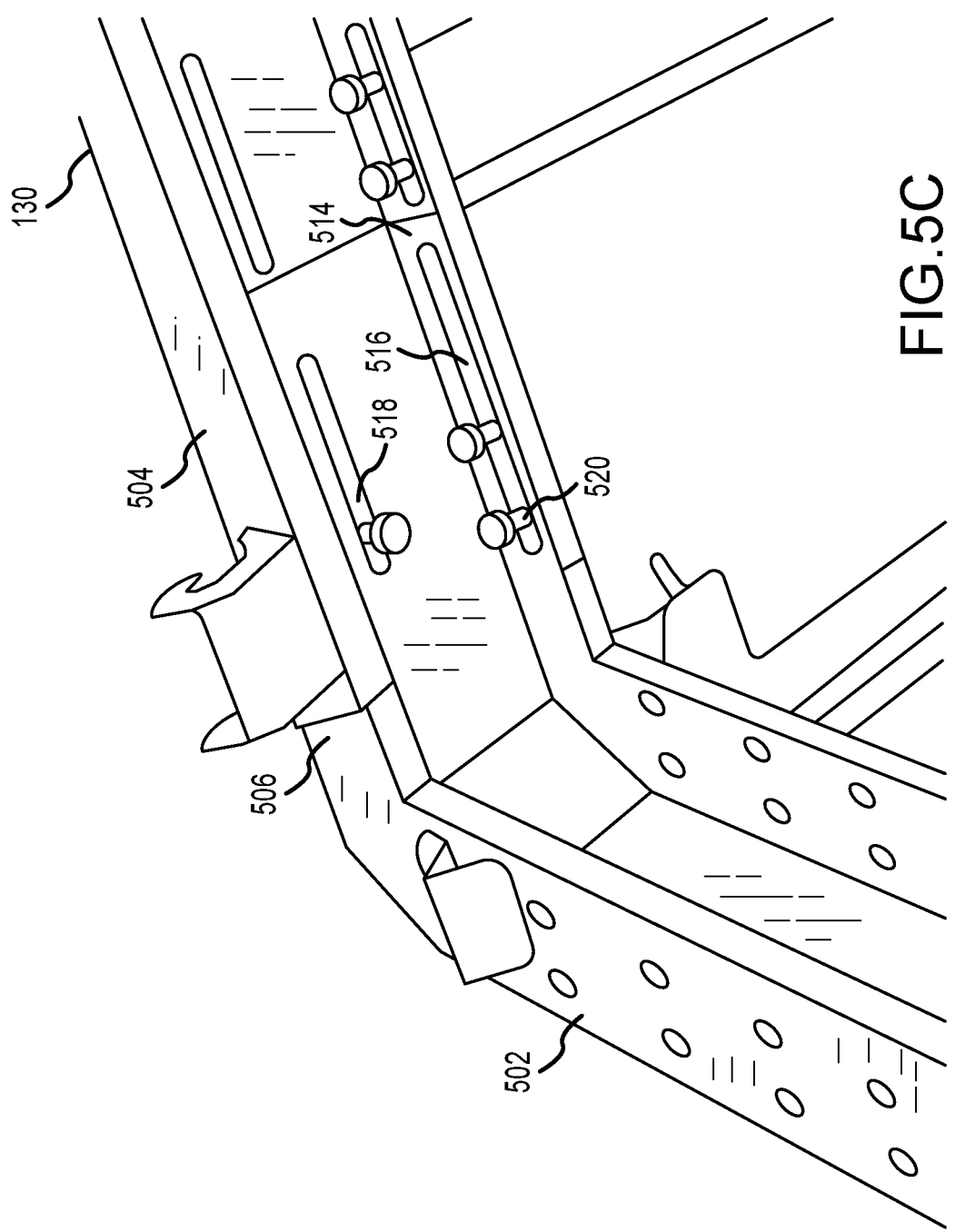

RECONFIGURABLE BED RACK SYSTEM AND METHOD

CROSS-REFERENCE TO RELATED APPLICATIONS

This application is related to and claims priority under 35 U.S.C. § 119(e) from U.S. Patent Application No. 62/902,202, filed Sep. 18, 2019 entitled "RECONFIGURABLE BED RACK SYSTEM AND METHOD," the entire contents of which is incorporated herein by reference for all purposes.

TECHNICAL FIELD

Aspects of the present disclosure generally relate to storage rack systems, and more particularly to reconfigurable storage rack systems for use with a plurality of different beds of a plurality of different vehicles including, but not limited to, pickup trucks.

BACKGROUND

Conventional vehicle racks, such as truck bed racks, generally attach to a vehicle to provide a base or structure upon which tools or equipment may be attached for transport by the vehicle. For example, a truck bed rack may attach to a bed of a truck to carry mountain bikes, motorcycles, camping equipment, and the like. Such racks, however, are typically static in design, not adaptable, heavy, difficult to install, and/or expensive to manufacture and purchase. In particular, truck bed racks are typically manufactured for a specific truck design or size such that, once installed, the dimensions of the rack remain static. In addition, installing a rack with different dimensions, such as a higher rack height, generally requires purchasing a new rack with the desired dimensions, removing the old bed rack, and installing the newly purchased bed rack, which is both expensive and time-consuming.

SUMMARY

One aspect of the present disclosure relates to a vehicle bed frame comprising a front support structure and a rear support structure. Each of the front support structure and the rear support structure comprising a pair of upright telescoping posts each comprising a mounting end and a connecting end opposite the mounting end and a telescoping cross rail connected between the connecting ends of the corresponding pair of upright telescoping posts. The vehicle bed frame further comprising a side rail connecting the front support structure and the rear support structure, wherein the pair of upright telescoping posts of the front support structure and the pair of upright telescoping posts of the rear support structure are slidably moveable to extend a length of each of the pair of upright telescoping posts and the telescoping cross rail of the front support structure and telescoping cross rail of the rear support structure are correspondingly slidably moveable to contract a length of the telescoping cross rails while attached to a vehicle.

Another aspect of the present disclosure relates to a method for adjusting a vehicle bed frame. The method may include the operations of mounting the vehicle bed frame on a bed of the vehicle and, while mounted on the bed of the vehicle, adjusting a height of the vehicle bed frame. Adjusting the height of the vehicle bed frame may include slidably telescoping a first pair of upright telescoping posts of a front support structure, each comprising a mounting end and a connecting end opposite the mounting end, to increase a length of the first pair of upright telescoping posts and slidably telescoping a second pair of upright telescoping posts of a rear support structure, each comprising a mounting end and a connecting end opposite the mounting end, to increase a length of the second pair of upright telescoping posts. Slidably telescoping the first pair of upright telescoping posts may cause a first telescoping cross rail connected between the connecting ends of the first pair of upright telescoping posts to slidably telescope to shorten a length of the first telescoping cross rail and slidably telescoping the second pair of upright telescoping posts may cause a second telescoping cross rail connected between the connecting ends of the second pair of upright telescoping posts to slidably telescope to shorten a length of the second telescoping cross rail.

Another aspect of the present disclosure relates to a vehicle-mounted frame comprising a front U-shaped support structure and a rear U-shaped support structure. Each of the front U-shaped support structure and a rear U-shaped support structure may include a pair of upright posts each comprising a mounting end and a connecting end opposite the mounting end and a pair of upright posts each comprising a mounting end and a connecting end opposite the mounting end. The vehicle-mounted frame may also include a plurality of upper rails extending between the cross rail of the front U-shaped support structure and the cross rail of the rear U-shaped support structure and a tire hoist bracket assembly extending between the plurality of upper rails, the tire hoist bracket assembly comprising a tire hoisting device housing.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 5A is an isometric view of telescopic posts of a reconfigurable truck bed rack in accordance with one embodiment.

FIG. 5C is a bottom view of the telescopic feature of the cross rails of a reconfigurable truck bed rack in accordance with one embodiment.

DETAILED DESCRIPTION

Aspects of the present disclosure involve a reconfigurable bed rack system and methods of manufacture and use that is dynamic, adaptable, lightweight, and easy to install. In one implementation, the bed rack system may include a plurality of U-shaped modular telescoping support structures that allow for a height adjustment to the rack without uninstalling the rack from the truck bed. In particular, each U-shaped telescoping support structure may include a pair of upright telescoping rails and a corresponding horizontal top telescoping cross rail between the upright rails that allow for the an adjustment to the height of each U-shaped support structure. Through the telescoping feature of the U-shaped support structures, a height dimension of the bed rack system may be increased or decreased. In one particular embodiment, the rack system provides for at least three platform height positions ranging from 14 inches to 19 inches to 23 inches. However, is it foreseen that the bed rack system may provide fewer or greater platform height positions, including heights less than 14 inches and greater than 23 inches. One or more side and/or upper rails may extend between the plurality of U-shaped modular telescoping supports for added structural support to the bed rack system. The side and/or upper rails may include one or more holes or other mounting configurations for attaching one or more mounting brackets. Such brackets may be configured to secure equipment, tools and/or supplies to the bed rack system. The bed rack system may also include a plurality of bed mounting plates for mounting the rack system to an in-bed rail system.

In one embodiment, the rack system may include a tire hoist bracket assembly attached to one or more upper rails of the rack system. The tire hoist bracket assembly may support a hoisting system between the upper rails of the rack system with a hoist cable extending down from the upper rails. The hoist cable may attach to a spare tire, in some instances, associated with the vehicle to which the rack system is attached. Through operation of the hoist device supported by the tire hoist bracket, the spare tire may be held against an upper, inner surface of the upper rails of the rack system for storage of the spare tire. Releasing the hoist cable may allow for removal of the spare tire from the storage location for application to the vehicle on which the bed rack system is mounted. Through the tire hoist bracket and system, a spare tire for the vehicle may be stored underneath the rack system thereby providing additional clearance space within the truck bed and/or underneath the vehicle where, traditionally, storage of a spare tire is provided.

Figure 1:
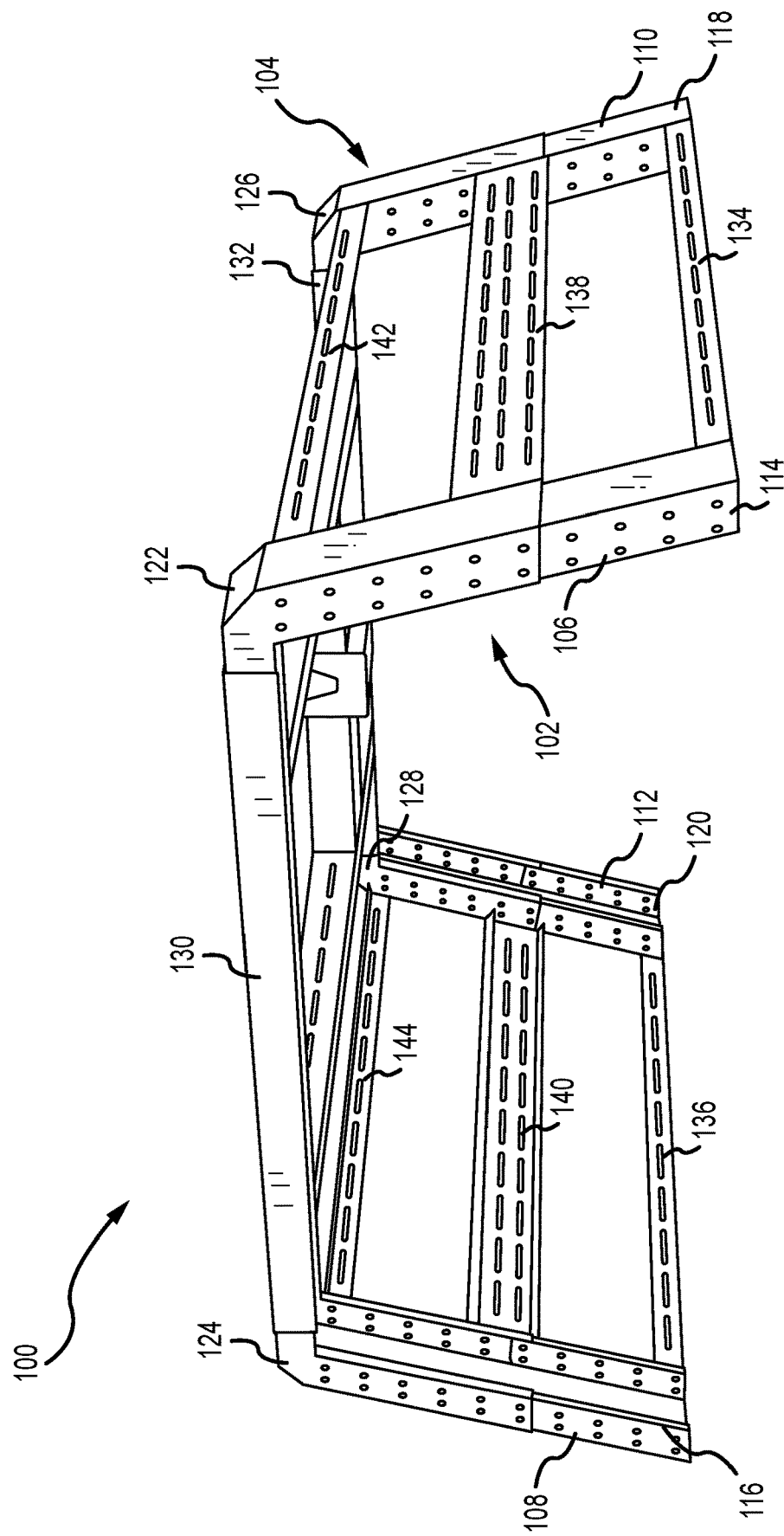
FIG. 1 is an isometric view of a reconfigurable truck bed rack in accordance with one embodiment.
Figure 2:
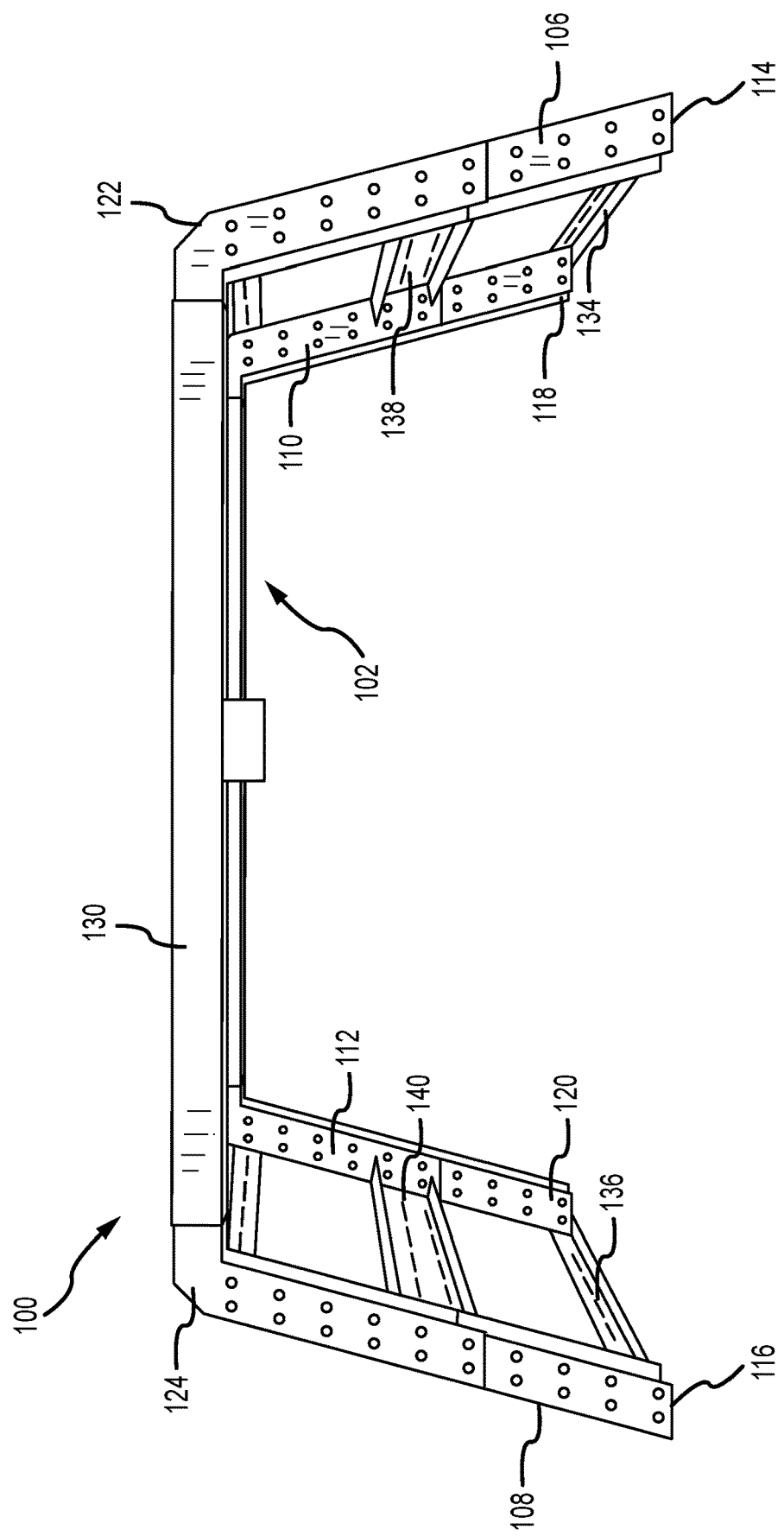
FIG. 2 is a front view of a reconfigurable truck bed rack in accordance with one embodiment.
Figure 3:
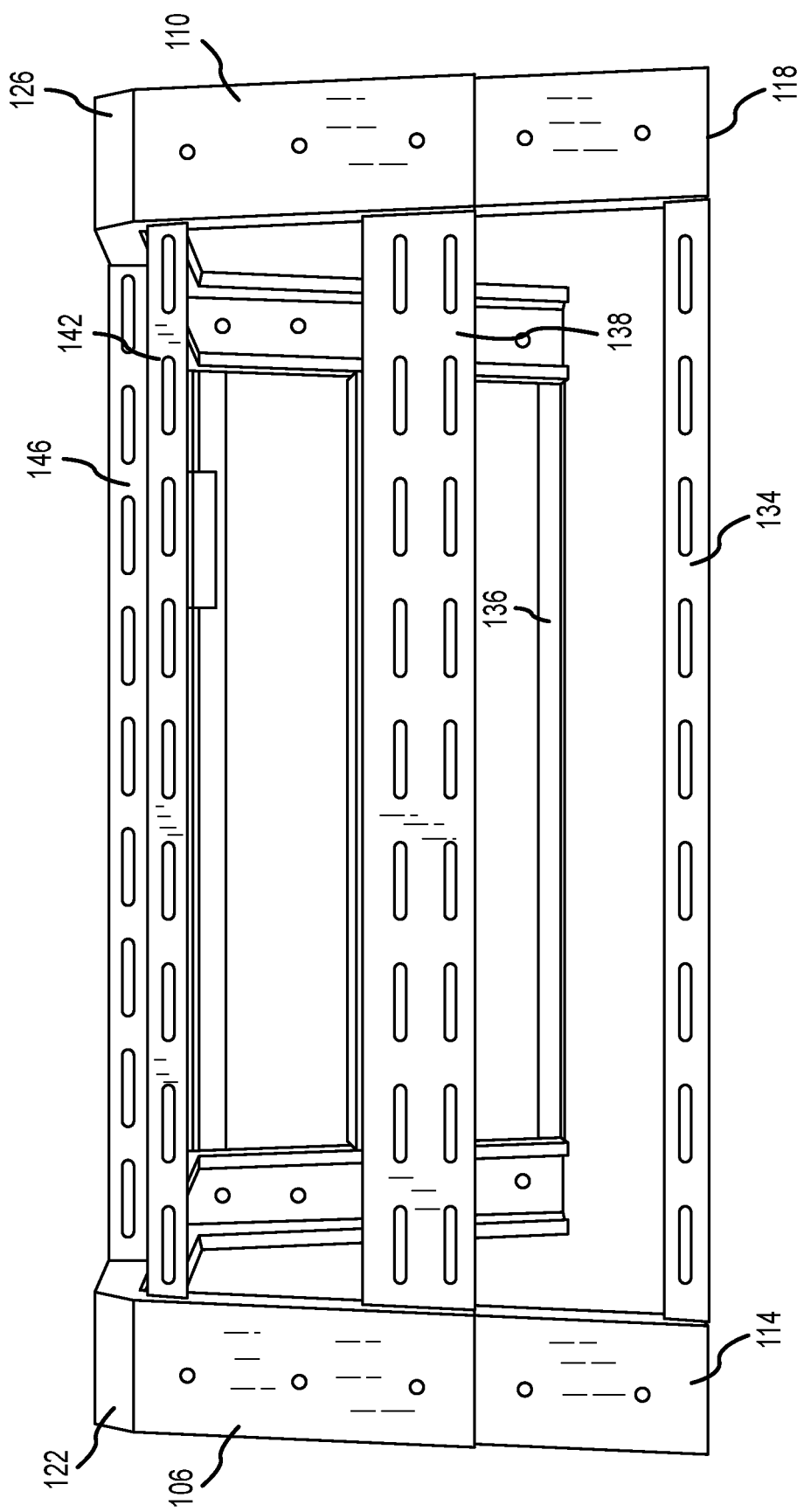
FIG. 3 is a side view of a reconfigurable truck bed rack in accordance with one embodiment.
Figure 4:
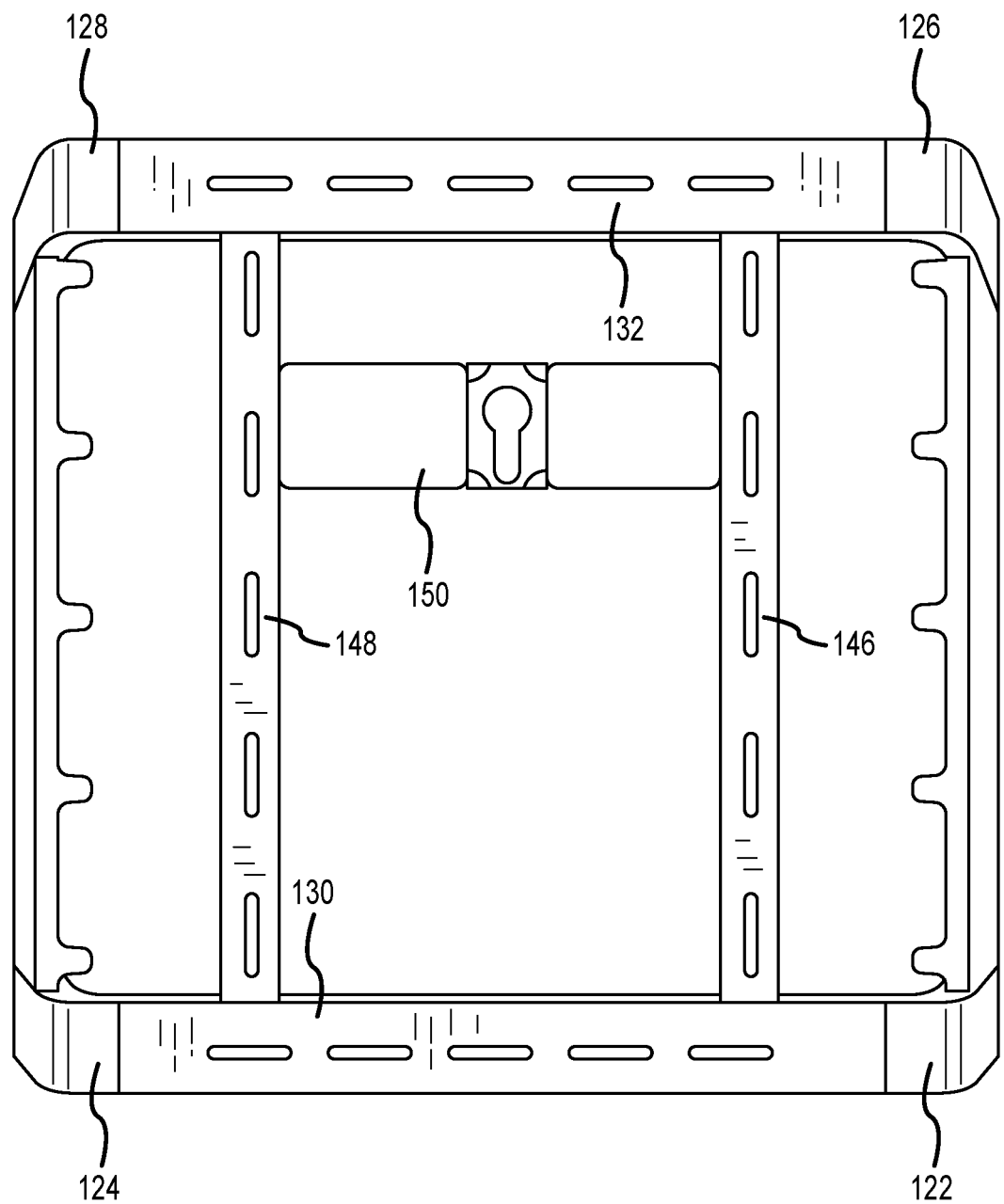
FIG. 4 is a top view of a reconfigurable truck bed rack in accordance with one embodiment.

Referring first to FIGS. 1-4, a reconfigurable bed rack system 100 is provided. In particular, FIG. 1 is an isometric view of a reconfigurable truck bed rack 100, FIG. 2 is a front view of the reconfigurable truck bed rack, FIG. 3 shows a side view of the reconfigurable truck bed rack, and FIG. 4 is a top view of the reconfigurable truck bed rack. The illustrated reconfigurable bed rack system includes a rearward U-shaped modular telescoping support structure 102 and a forward U-shaped modular telescoping support structure 104. Other embodiments of the bed rack system 100 may include additional U-shaped support structures. For example, the bed rack system 100 may include three U-shaped support structures, four U-shaped structures, etc. The rear U-shaped support 102 may include a pair telescoping upright rails 106, 108 and the front U-shaped support 104 may include a similar pair telescoping upright rails 110, 112. The telescoping upright rails 106-110 may, in some instances, extend angularly inward toward the corresponding upright rail of the U-shaped support structure. In one particular example shown in FIGS. 1-4, the upright rails 106-110 may extend inwardly at an angle of 15 degrees, although other angles of extension are also contemplated. Each upright rail 106-110 may include a lower end 114-120 and an upper end 122-128, the upright rail angled inward from the lower end 114-120.

Figure 5B:
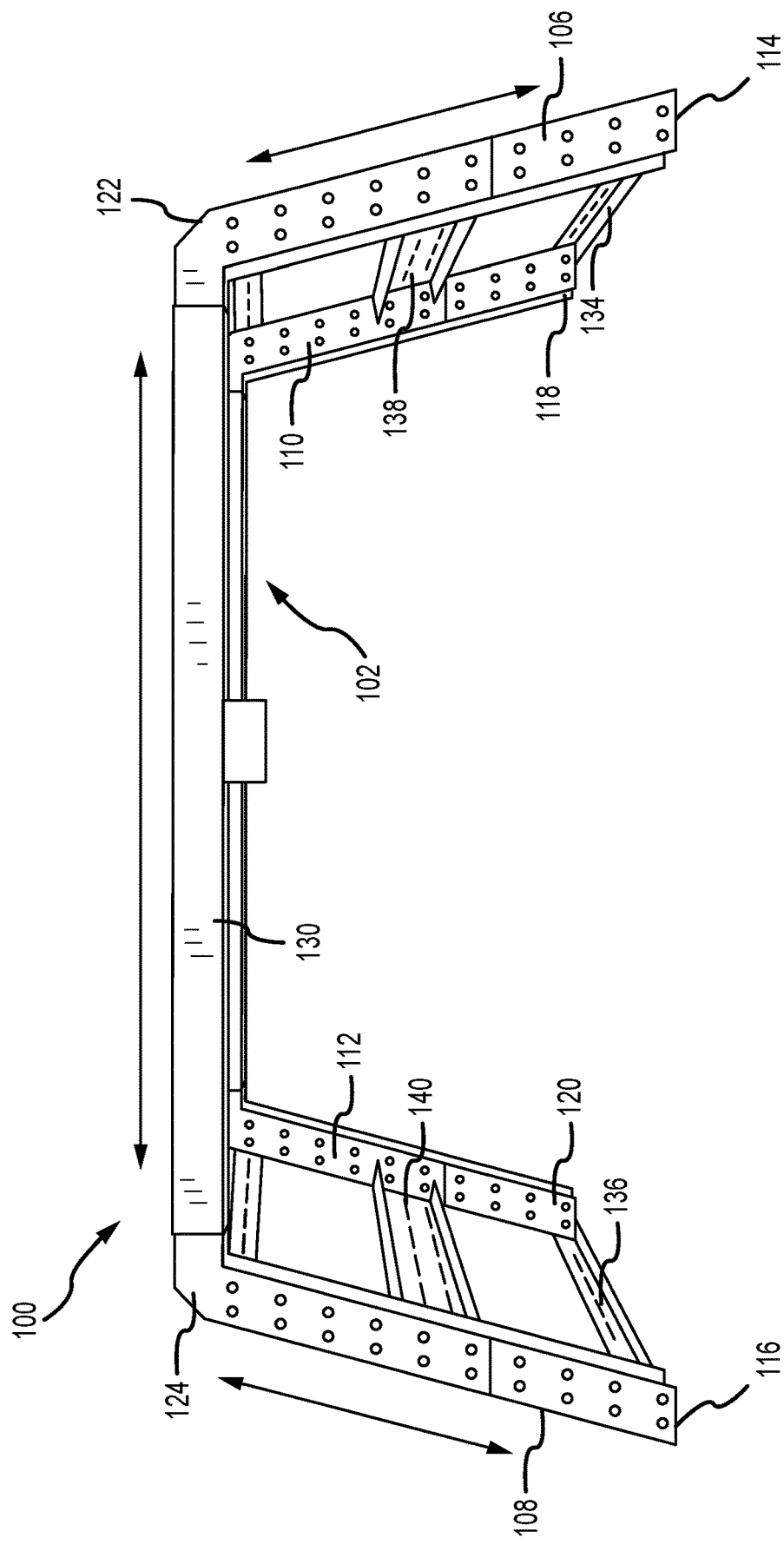
FIG. 5B is a front view of telescopic posts of a reconfigurable truck bed rack in accordance with one embodiment.

A horizontal, telescoping cross rail 130 may connect the pair of upright rails 106,108 for each U-shaped modular telescoping support structure 102, 104. For example, horizontal cross rail 130 may extend between upper ends 122, 124 of the upright rails 106, 108 to form the rear U-shaped telescoping support 102. Horizontal cross rail 132 may similarly extend between upper ends 126, 128 of the upright rails 110, 112 to form the front U-shaped telescoping support 104. Each of the upright rails 110, 112 and horizontal cross rail 130 may include telescoping mechanisms to allow for adjustment in the length of the upright rails 110, 112 and/or the horizontal cross rail 130. More particularly and shown best in FIGS. 5A and 5B, each of the upright portions 110, 112 may include an outer sleeve 502 and an inner rail portion 504. The inner rail portion 504 may slide into and out of the outer sleeve 502 to extend or shorten the length of the upright rail 106. In a similar manner, the horizontal cross rail 130 of each upright rail may also include an inner rail 506 and an outer sleeve 508 such that the inner rail 506 may slide into or out of the outer sleeve 504 to increase or shorten the length of the horizontal cross rail 130. To adjust the overall height of the bed rack system, the length of each upright rails 106 of the rack system may be extended through the telescoping feature of the upright rails. As the upright rails 106, 108 are angled toward each other, increasing the length of the upright rails may cause the length of the horizontal cross rail 130 to shorten via the telescoping feature of the horizontal cross rail, as shown by the arrows of FIG. 5B. In a similar manner, shortening the length of the upright rails 106, 108 may cause the length of the horizontal cross rail 130 to increase via the telescoping feature of the horizontal cross rail 130.

The outer sleeve 502 of the upright rail 106 may be held in position on the inner rail portion 504 via any connector, such as a bolt 508 or other fastener passing through the outer sleeve 502 and the inner pole 504. The bolt may be held in place with a corresponding nut screwed onto the bolt. To adjust the height of the bed rack system 100, the bolt may be loosened or removed from the upright rail 106 and the outer sleeve 502 may slide along the inner rail 504 to a desired position, either extending or shortening the length of the upper rail 106. The bolt or other fastener may be replaced through the outer sleeve 502 and the inner rail portion 504 to again hold the outer sleeve in position at the desired height or length. In some embodiments, configuration holes 510 may be located along and through the outer sleeve 502 and inner rail portion 504 of the upright rail 106 at predetermined locations to provide standardized height options for the reconfigurable bed rack 100. For example, a first positioning hole 512 may be located through the upright rail 106 that provides the bed rack with a height of 14 inches (measured from a bottom edge of the rack 100 to a bottom surface of the horizontal cross rail 130). Other positioning holes, such as a second positioning hole to provide a height of 19 inches and a third positioning hole 510 to provide a height of 23 inches, may also be located on the upright rail 106. In general, however, any number of positioning holes 510, 512 or other types of fasteners 508 may be used to provide the bed rack system with any height. A similar connector system and telescoping feature may be present on each upright rail 106-112 of the rack 100 such that all of the upright rails may be adjusted simultaneously and held in place at the desired height. In other embodiments, each upright rail 106-112 may be adjusted individually to provide the bed rack system 100 with varying heights or clearances. For example, the rear U-shaped support structure 102 may be set at a first height while the front U-shaped support 104 may be set at a different height. In some instances, the selected height of the reconfigurable bed rack system 100 may be made to ensure that the top surface of the rack lies above a cab of a truck on which the bed rack system 100 is mounted.

FIG. 5C illustrates a bottom view of the telescopic feature of the cross rails 130, 132 of the reconfigurable truck bed rack 100 in accordance with one embodiment. To provide for the telescoping feature, the inner rail 506 of the horizontal cross rail 130 may include a slidable portion 514 that slides into and out of the outer sleeve 504 of the cross rail. The slidable portion 514 may include one or more slide slots 516, 518 to guide the inner rail 506 in relation to the outer sleeve 504. In the example shown, the slidable portion 514 includes a sidewall guide slot 516 and an upper wall guide slot 518. The guide slots 516, 518 may be elliptical holes through the inner rail 506. One or more slide posts 520 may be disposed on an inner surface of the outer sleeve 504 and pass through the one or more guide slots 516, 518. During the telescoping of the cross rail 130, the slide posts may slide along the guide slots 516, 518 as the inner rail 506 slides into or out of the outer sleeve 508 of the cross rail 130. The guide slots 516, 518 and slide posts 520 operate to retain the inner rail 506 within the outer sleeve 508 and to ensure proper sliding of the inner rail during the telescoping of the horizontal cross rail 130. Similar mechanisms may be present on each telescoping features of the horizontal cross rails 130, 132 of the reconfigurable bed rack system 100.

Returning to the reconfigurable bed rack 100 of FIGS. 1-4, one or more side rails 134¬144 and/or upper rails 146, 148 may be disposed between the pair of U-shaped supports 102, 104. In the particular example illustrated, a pair of lower side rails 134, 136 may connect the lower ends 114, 116 of the front U-shaped support 104 to the lower ends 118, 120 of the rear U-shaped support 102. A pair of upper side rails 142, 144 may connect the upper ends 122, 124 of the front U-shaped support 104 to the upper ends 126, 128 of the rear U-shaped support 102. The lower side rails 134, 136 and the upper side rails 142, 144 may provide structural support to the reconfigurable bed rack in addition to providing support for one or more mounting brackets, as described in more detail below. One or more additional side rails 138, 140 may similarly be disposed between the upright portions 106, 108 of the front U-shaped support 104 and the upright portions 110, 112 of the rearward U-shaped support 102. These additional side rails 138, 140 may also provide structural support to the bed rack 100 by connecting the pair of U-shaped support structures 102, 104. One or more top rails or upper rails 146, 148 may also connect the horizontal cross rail 130 of the front U-shaped support structure 104 and the horizontal cross rail 132 of the rear U-shaped support structure 102. Similar to the side rails discussed herein, the upper rails 146, 148 may also providing support for one or more mounting brackets upon which equipment, devices, and the like may attach to the reconfigurable bed rack 100. Any of the side or upper rails discussed herein may or may not be present on the bed rack system 100. For example, the side rails 134-144 may be modular such that all, some, or none of the side rails may be attached to the U-shaped supports 102, 104. Similarly, all, some, or none of the upper rails 146, 148 may also be attached to the bed rack system 100. The modular feature of the components of the bed rack system 100 provide for a reconfigurable feature of the rack system.

In one particular implementation, the components may be composed of laser cut steel of appropriate thickness to provide support of various equipment and supplies to the truck bed rack 100. In one implementation, the reconfigurable rack system 100 may support 800 pounds of static load or 425 pound of dynamic load. However, other materials and tolerances of the components of the bed rack 100 are contemplated and may be used in manufacturing of the rack system 100. In addition, the width of the reconfigurable bed rack system 100 may be available in various lengths for different sizes of truck beds or other portions of a vehicle. The forward to rear length may also vary based on the bed rack application and the number of U-shaped supports utilized in the rack 100.

Figure 6:
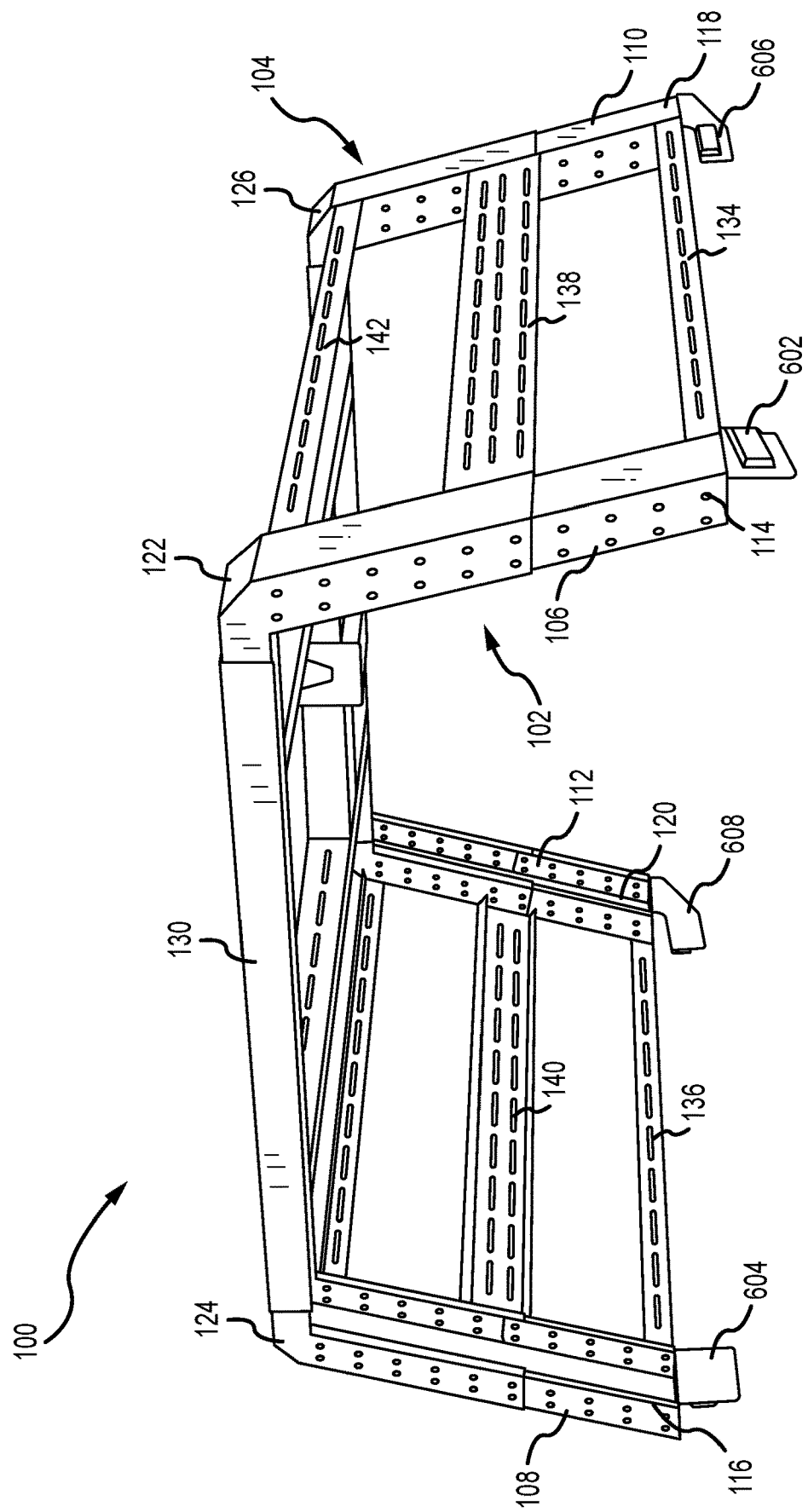
FIG. 6 is an isometric view of a reconfigurable truck bed rack with bed mounting plates in accordance with one embodiment.
Figure 7:
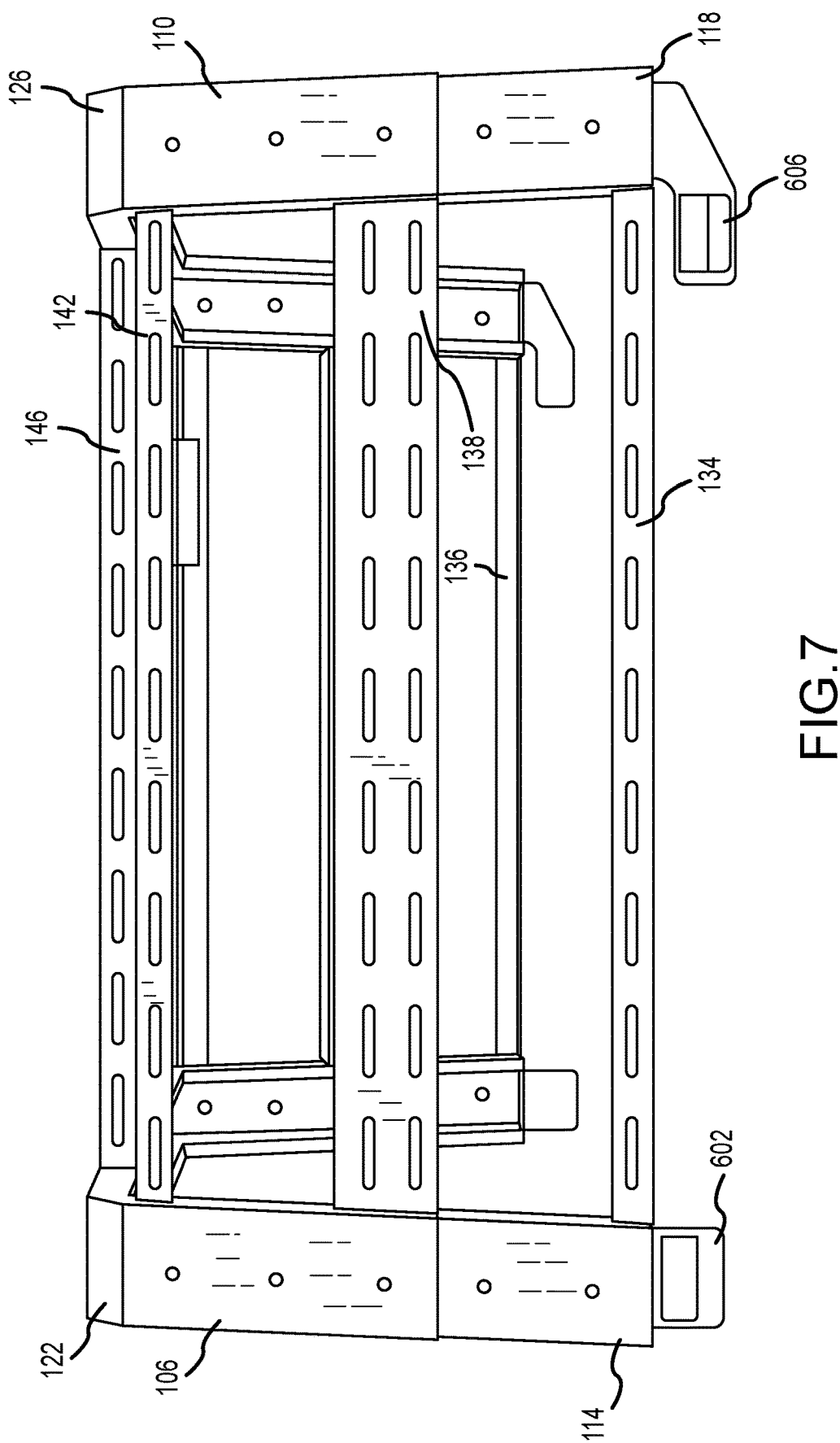
FIG. 7 is a side view of a reconfigurable truck bed rack with bed mounting plates in accordance with one embodiment.
Figure 8:
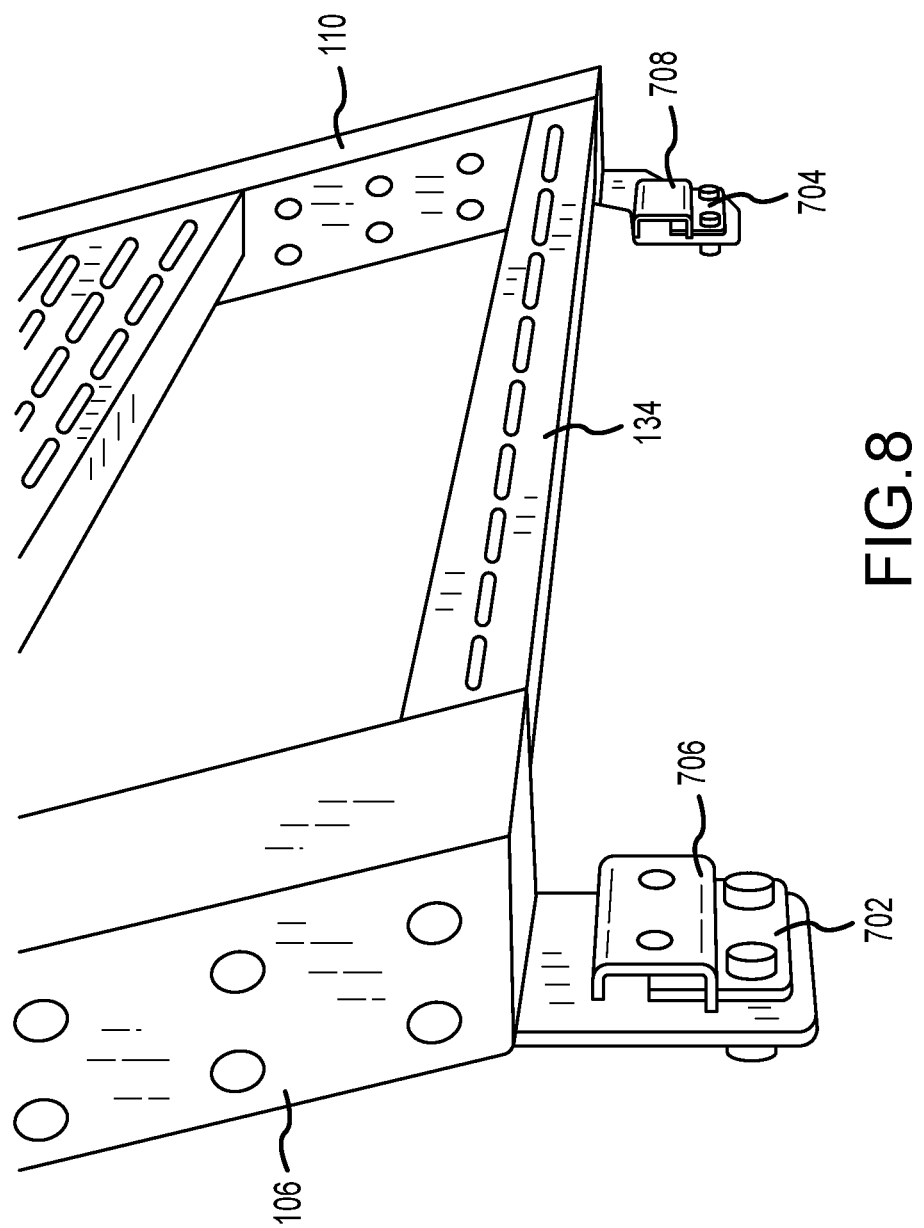
FIG. 8 is an isometric view of bed mounting plates of a reconfigurable truck bed rack in accordance with one embodiment.

The reconfigurable bed rack system 100 may attach to a vehicle via a variety of different mechanisms. In one embodiment illustrated in FIGS. 6-8, one or more bed mounting brackets 602-608 may be attached to the lower ends 114-120 of the U-shaped support structures 102, 104. The bed mounting brackets 602-608 may extend generally downward from the lower ends 114-120 of the U-shaped support structures 102, 104 to engage or otherwise attach to a portion of a vehicle for mounting the bed rack system 100 onto the vehicle. For example, the bed mounting brackets 602-608 may engage an in-bed rail system of a bed of a pickup truck vehicle. More particularly and shown best in FIGS. 7 and 8, the bed mounting brackets 602-608 may include a bed mounting plate 702, 704 upon which a bed mounting rail 706, 708 is attached. The bed mounting plate 702 of the bed mounting bracket 602, 604 extending from the lower end 114, 116 of the rear U-shaped support structure 102 may be generally rectangular. The bed mounting plate 704 of the bed mounting bracket 606, 608 extending from the lower end 118, 120 of the forward U-shaped support structure 104 may be generally L-shaped, in one implementation. Each bed mounting plate 702, 704 may include a bed mounting rail 706, 708 attached to the respective bed mounting plate 702, 704 that extends from the respective bed mounting plate and may be oriented to engage with the in-bed rail system of a pickup truck vehicle.

One or more bolts or other fasteners may secure the bed mounting brackets 602-608 to the in-bed rail system of the pickup truck. In other implementations, one or more drill-less clips or other similar fastener types may attach the bed mounting brackets 602-608 to the truck bed and hold the reconfigurable bed rack system 100 to the vehicle upon which the rack system is mounted.

As should be appreciated, the height or other dimensions of the reconfigurable bed rack system 100 may be adjusted without disengaging the mounting brackets 602-608 from the truck bed. In particular, the telescoping features of the upright rails 106-112 and the cross rails 130, 132 of the U-shaped support structures 102, 104 allow for the extension of the upright rails (and corresponding shortening of the cross rails) to increase the height of the bed rack system 100 without removing the rack from the bed or vehicle to which it is attached. Similarly, the telescoping features of the upright rails 106-112 and the cross rails 130, 132 of the U-shaped support structures 102, 104 allow for the shortening of the upright rails (and corresponding lengthening of the cross rails) to decrease the height of the bed rack system 100 without removing the rack from the bed or vehicle to which it is attached. In one instance, an adjustment bolt 508 or other fastener may be removed from a positioning hole 510 to adjust the height of the bed rack 100 and reinserted through another positioning hole at the desired rack height. In this manner, the dimensions of the reconfigurable bed rack 100 may be adjusted easily without the need to remove the rack from attachment to the accompanying vehicle.

Figure 9:
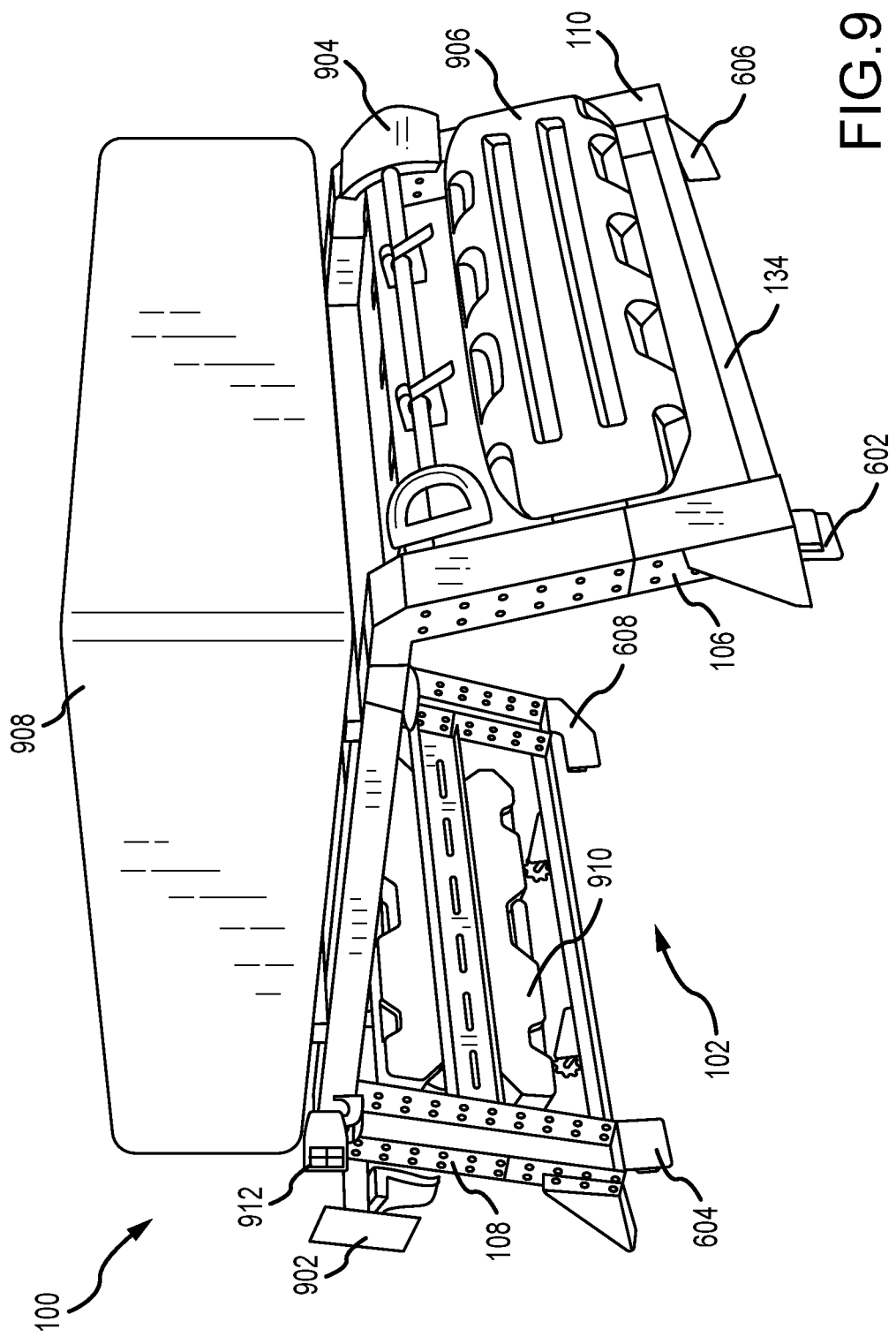
FIG. 9 is an isometric view of a reconfigurable truck bed rack with mounted accessories in accordance with one embodiment.
Figure 10A:
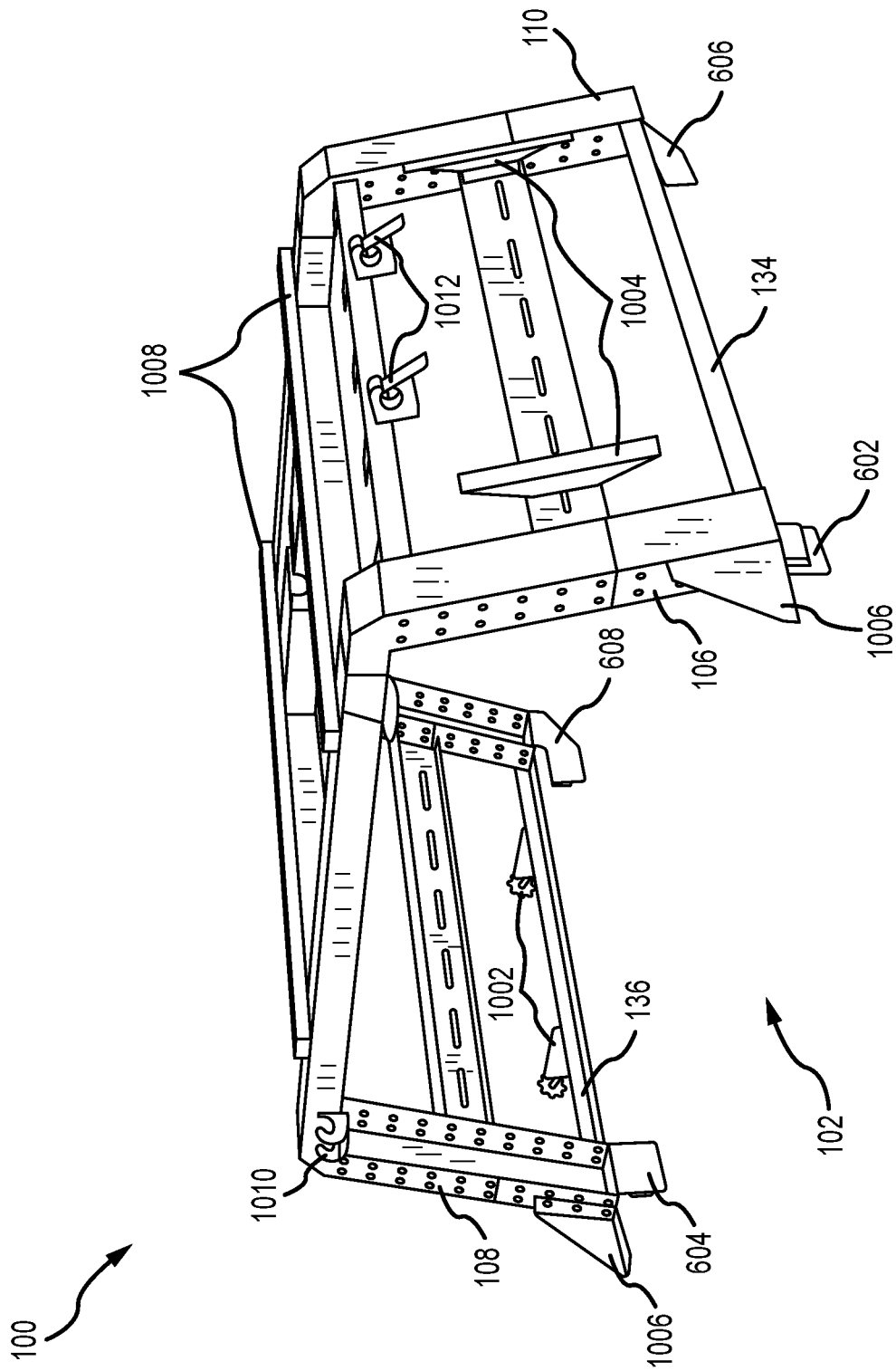
FIGS. 10A-10B is an isometric view of a reconfigurable truck bed rack with mounting brackets for mounting accessories to the truck bed rack in accordance with one embodiment.
Figure 10B:
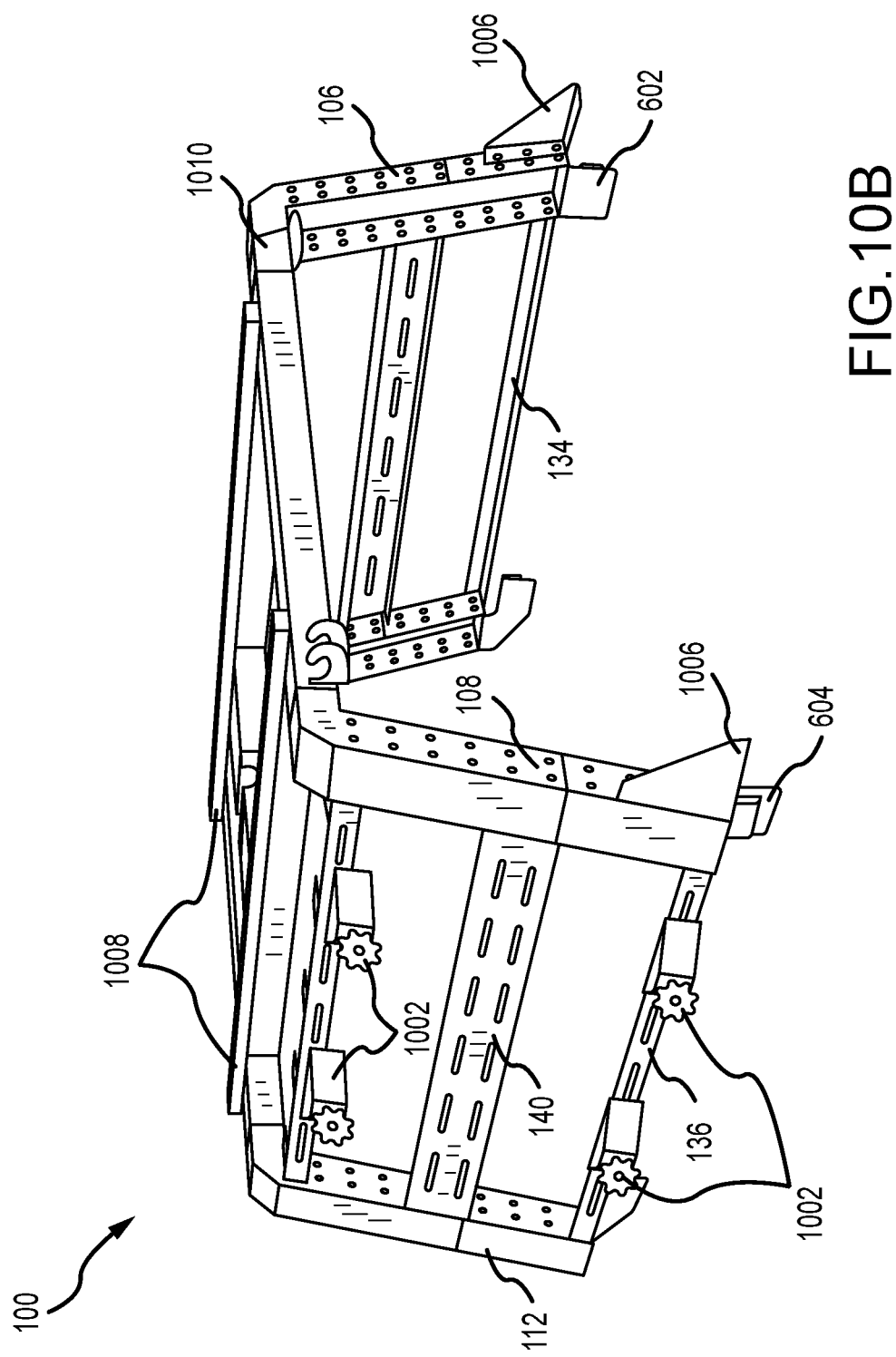

As discussed above, various types of equipment and/or supplies may be attached to the reconfigurable bed rack system 100 for transport. FIG. 9 illustrates an isometric view of a reconfigurable truck bed rack 100 with mounted accessories in accordance with one embodiment. For example, one or more of a shovel 904, a lifting jack 902, camping equipment 908, fuel tanks 910, traction boards 906, bicycles, and the like may be attached to the bed rack system 100 for transport by the vehicle to which the rack system is attached. To accommodate the mounting of supplies and/or equipment to the reconfigurable bed rack 100, one or more supply mounting brackets may be attached to the cross rails or side rails of the bed rack system 100. The supply mounting brackets may be configured to engage with one or more of the equipment 902-912 pieces to hold the equipment on the bed rack system 100. In particular, FIG. 10A is a first isometric view of a reconfigurable truck bed rack 100 with supply mounting brackets for mounting accessories to the truck bed rack in accordance with one embodiment and FIG. 10B is a second isometric view of a reconfigurable truck bed rack 100 with supply mounting brackets for mounting accessories to the truck bed rack. In general, each of the supply mounting brackets discussed below may attach to the bed rack system 100 through a variety of attachment devices. For example, one or more of the side rails 134-144, one or more of the upper rails 146, 148, and/or one or more of the U-shaped support structures 102, 104 may include one or more mounting holes through the corresponding rails. The mounting holes may accept a bolt or other attachment mechanism for attaching supply mounting brackets to the bed rack system 100. Other attachment mechanisms may also be used to attach the supply mounting brackets to the rack system 100, such as attachment clips, adhesive, and the like.

Several supply mounting brackets are illustrated in FIG. 10. In particular, one or more jack brackets 1002 may be attached to a rail (such as side rail 136) of the bed rack system 100 via one or more bolts passing through the jack bracket and the side rail. The jack brackets 1002 may include a clamp that is activated to hold equipment, such as a lifting jack, within the hack bracket 1002. The rack 100 may also include one or more traction board brackets 1004 mounted to a component of the rack 100, such as side rail 138. Traction board brackets 1004 may include an elongated bracket to engage a rear side of a traction board 906. One or more of the side rails 138, 140 may similarly be designed to engage with the traction board brackets 1004 through a bolt connector or other type of connector. Further, one or more ratchet strap brackets 1006 may attach to the bed rack system 100 through which straps or tie-downs may be thread to tie or otherwise attach a load to the bed rack system 100 for transport. One or more light or speaker mount brackets 1010 may also be attached to various components or surfaces of the bed rack system 100. In the example shown, the light or speaker mount brackets 1010 attach to the rear cross bar rail 130 and may accommodate a light fixture or speaker devices. One or more upper rail brackets 1008 may also be attached to the upper rails 146, 148 and provide additional attachment options on top of the bed rack system 100. In one particular example, the upper rail brackets 1008 may include attachment mechanisms for a bicycle to mount the bicycle to the top of the bed rack system 100. One or more quick-release clamp brackets 1012 may also be attached to the rack system 100, such as to upper side rail 142 or any other side rail. Although several examples of different supply mounting brackets are discussed herein, it should be appreciated that various other supply mounting brackets may be included with or attached to the bed rack system 100. Further, the bed rack system 100 may include any number of mounting holes to accommodate any number of supply mounting brackets to attach equipment and supplies to the truck bed rack system 100.

One feature of the bed rack system 100 include the modularity of the components of the system. For example, lower side rails 134, 136 and/or upper side rails 142, 144 may or may not be attached to the truck bed system 100, or may be located in a different configuration or location on the rack system. One or more of the supply mounting brackets 1002-1012 may also be attached or nor attached to the bed rack system 100 to accommodate the various needs/types of supplies and equipment of users of the rack system. One or more of the bed mounting brackets 602-608 may also be present or removed from the bed rack system 100 to adjust the attachment of the rack system to a corresponding vehicle. Through this modular design, the bed rack system 100 may be configured into multiple designs to accommodate the needs and/or desires of a user of the bed rack system.

Figure 11A:
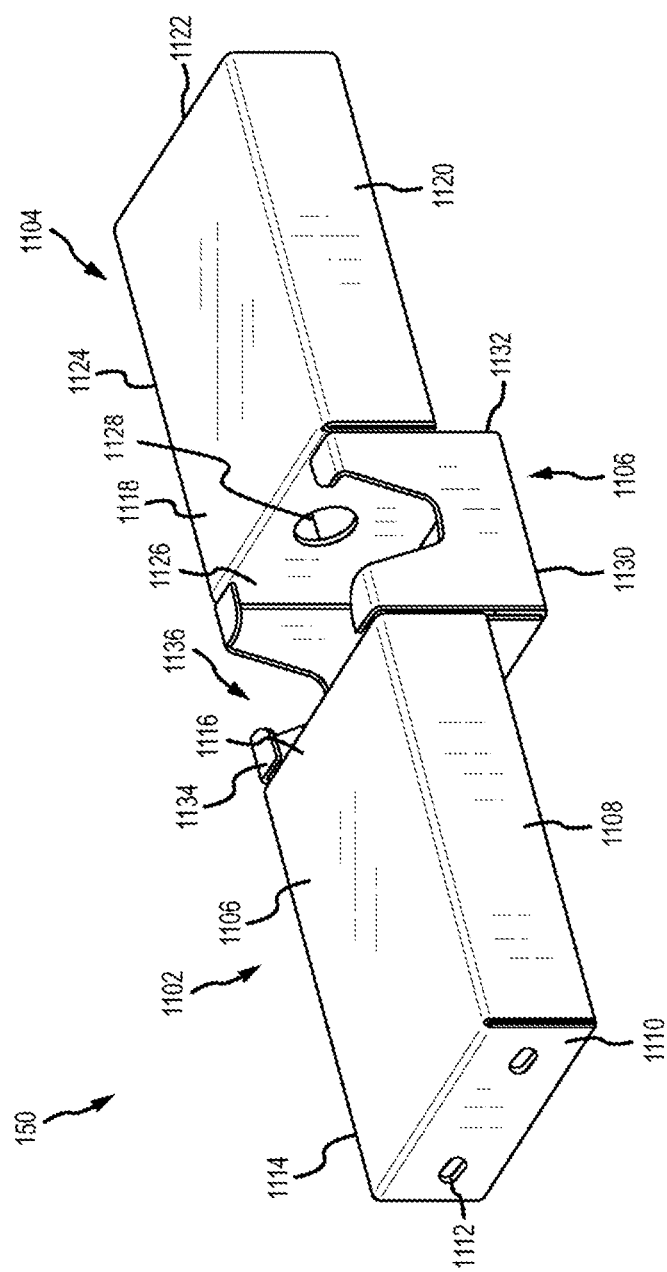
FIG. 11A is an isometric view of a tire hoist accessory for mounting to a reconfigurable truck bed rack in accordance with one embodiment.
Figure 11B:
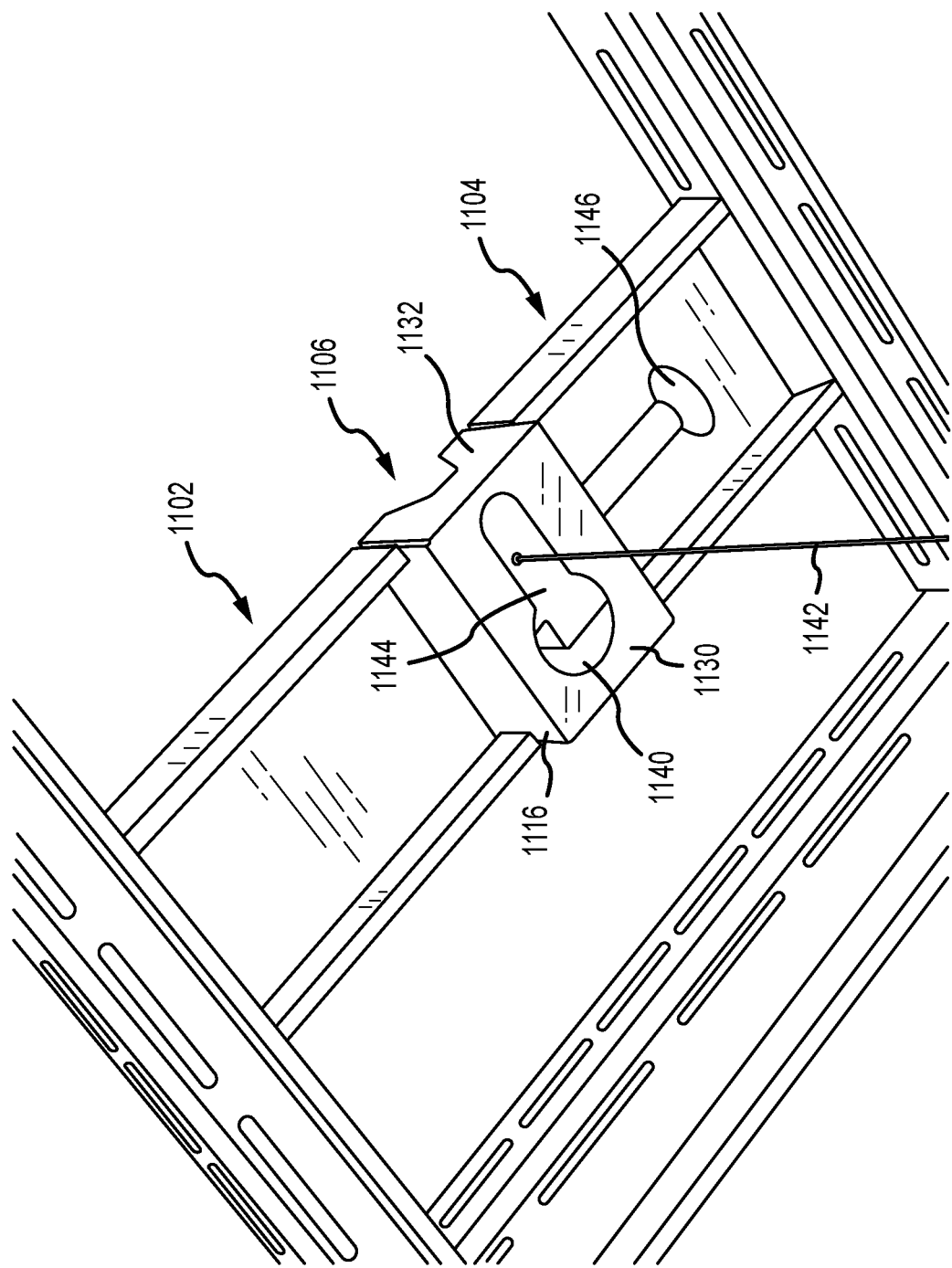
FIG. 11B is a bottom view of a tire hoist accessory for mounting to a reconfigurable truck bed rack in accordance with one embodiment.

An additional accessory for the bed rack system 100 includes a spare tire hoist bracket assembly. In particular, FIG. 11A is an isometric view of a tire hoist bracket assembly 150 for mounting to the reconfigurable truck bed rack and FIG. 11B is a bottom view of a tire hoist accessory for mounting to a reconfigurable truck bed rack in accordance with one embodiment. In the embodiment shown, the tire hoist bracket assembly 1100 may be rectangular and include a first tire hoist mounting bracket 1102, a hoist housing portion 1104, and a second tire hoist mounting bracket 1106. In one embodiment, the tire hoist bracket assembly 150 may be formed from a folded sheet of metal, such as a steel or other sturdy material. The first tire hoist mounting bracket 1102 may be generally box-shaped and include an upper surface 1106, a rear surface 1108, a mounting surface 1110, a front surface 1114, and a housing surface 1116. Similarly, the second tire hoist mounting bracket 1104 may also be generally box-shaped and include an upper surface 1118, a rear surface 1120, a mounting surface 1122, a front surface 1124, and a housing surface 1126. The hoist housing portion 1106 may be disposed between the first tire hoist mounting bracket 1102 and the second tire hoist mounting bracket 1104. In general, the hoist housing portion 1106 is a box-shaped housing with an open top and sized appropriately to accommodate a tire hoisting device 1144 within the housing 1106. More particularly, the open box structure of the hoist housing portion 1106 may include the housing surface 1116 of the first tire hoist mounting bracket 1102, the housing surface 1126 of the second tire hoist mounting bracket 1104, a bottom surface 1130 perpendicular to and connecting the housing surface 1116 of the first tire hoist mounting bracket 1102 and the housing surface 1126 of the second tire hoist mounting bracket 1104, a forward side wall 1134, and a rearward side wall 1132. The forward sidewall 1134 may include a parabolic cutout 1136 extending from a top edge of the forward sidewall 1134 toward the center of the sidewall. The parabolic cutout 1136 may provide access and/or clearance for a hoisting device placed or located within the hoist housing portion 1106. The rearward sidewall 1132 may include a similar shaped parabolic cutout 1138. In general, the sides of the hoist housing portion 1106 contain the tire hoisting device within the housing and the open top allows for removal of the hoisting device by a user of the bed rack system 100. In some embodiments, portions of the top edge of the forward sidewall 1134 may extend perpendicular to the forward sidewall 1134 toward the interior of the hoist housing portion 1106. Portions of the top edge of the rearward sidewall 1132 may similarly be bent toward the interior of the housing 1106. The extending tabs from the forward sidewall 1134 and the rearward sidewall 1132 may contact a hoisting device 1144 located within the housing 1106 to further retain the hoisting device in place.

The bottom surface 1130 of the hoist housing portion 1106 may include a hoist wire access hole 1140 through which a wire, chain, or string 1142 of the hoisting device may extend. In one particular embodiment, the hoist wire access hole 1140 may be keyhole shaped to accommodate various hoisting device designs. In addition, the bottom surface 1130 of the hoist housing portion 1106 may also include one more hoist device 1144 mounting holes through which one or more bolts or other attachment mechanisms may pass through to attach the hoisting device to the bottom surface 1130. Other attachment mechanisms for locating the hoisting device 1144 within the hoist housing portion 1106 are also contemplated. In addition, the housing surface 1116 of the first tire hoist mounting bracket 1102 and/or the housing surface 1126 of the second tire hoist mounting bracket 1104 may include an access hole 1128 through which a crank to activate or control the tire hoist may be inserted. In other words, a tire hoist crank 1146 may be inserted through the access hole 1128 of the housing surface 1116 of the first mounting bracket 1102 or the housing surface 1126 of the second mounting bracket 1104 to engage a corresponding hoist activation bolt. In general, the tire hoist 1144 may raise or lower the hoist cable 1142 through a rotation of the crank 1146 and corresponding hoist bolt. When attached to the tire hoist 1144, the crank 1146 may extend through the housing wall and under the upper surface 1106 of the first tire hoist mounting bracket 1102 or the upper surface 1118 of the second tire hoist mounting bracket 1104.

Figure 12:
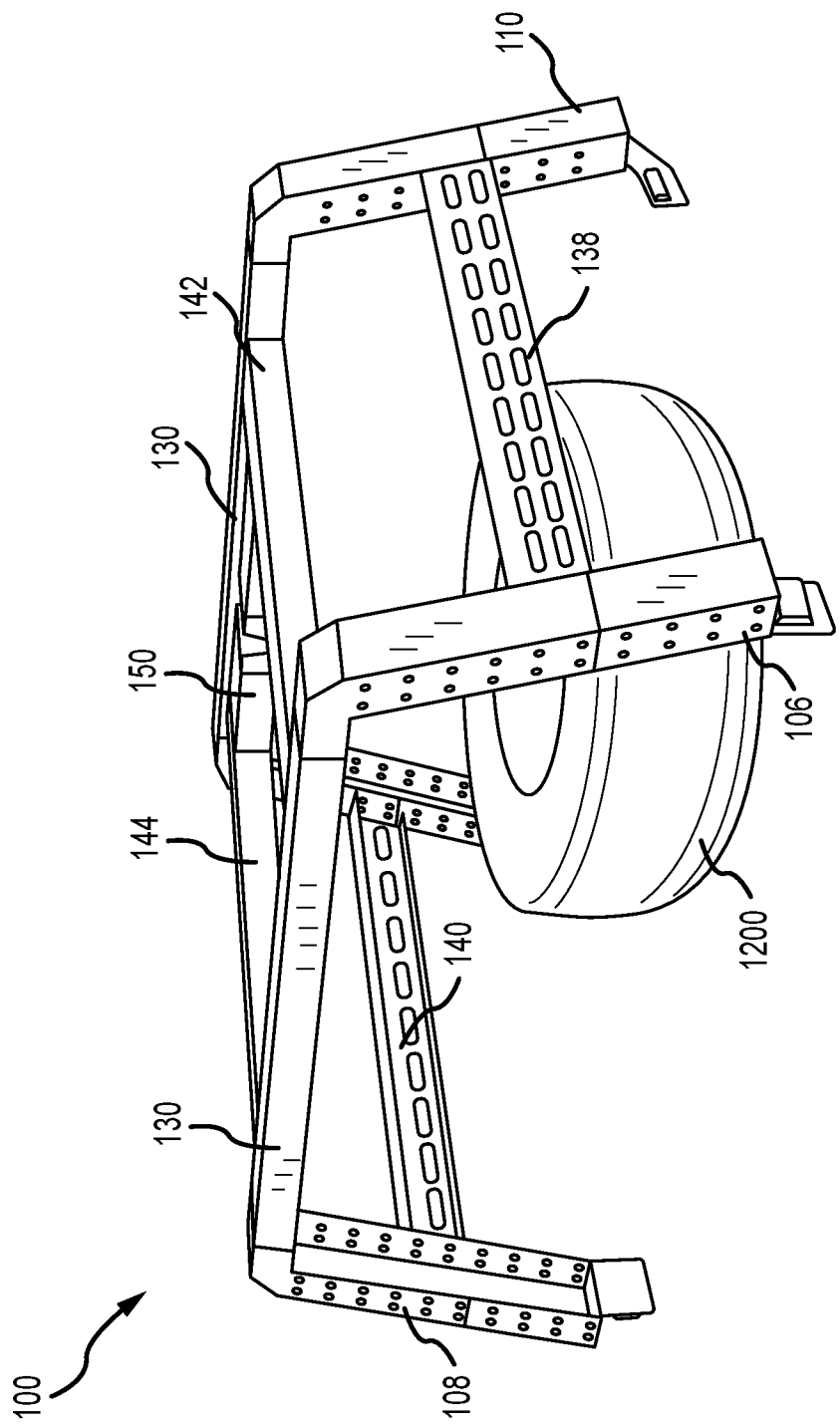
FIG. 12 is an isometric view of a reconfigurable truck bed rack with a tire hoist accessory in accordance with one embodiment.

As best seen in FIGS. 4 and 12, the tire hoist bracket assembly 150 may be attached to bed rack assembly system 100. In one particular implementation, the tire hoist bracket assembly 150 may be attached between the upper rails 146, 148 such that the hoist chain or wire extends down from the tire hoist bracket assembly 150. To attach the tire hoist bracket assembly 150 to the upper rails 146, 148, one or more mounting holes 1112 may be located through the mounting surface 1110 of the first tire hoist mounting bracket 1102 and/or the mounting surface 1122 of the second tire hoist mounting bracket 1104. The one or more mounting holes 1112 may accept a bolt or other mounting mechanism such that the tire hoist bracket assembly 150 may be securely fastened between the upper rails 146, 148 of the bed rack system 100. Other mechanisms for attaching the tire hoist bracket assembly 150 to the bed rack system 100 may also be used.

Figure 13:
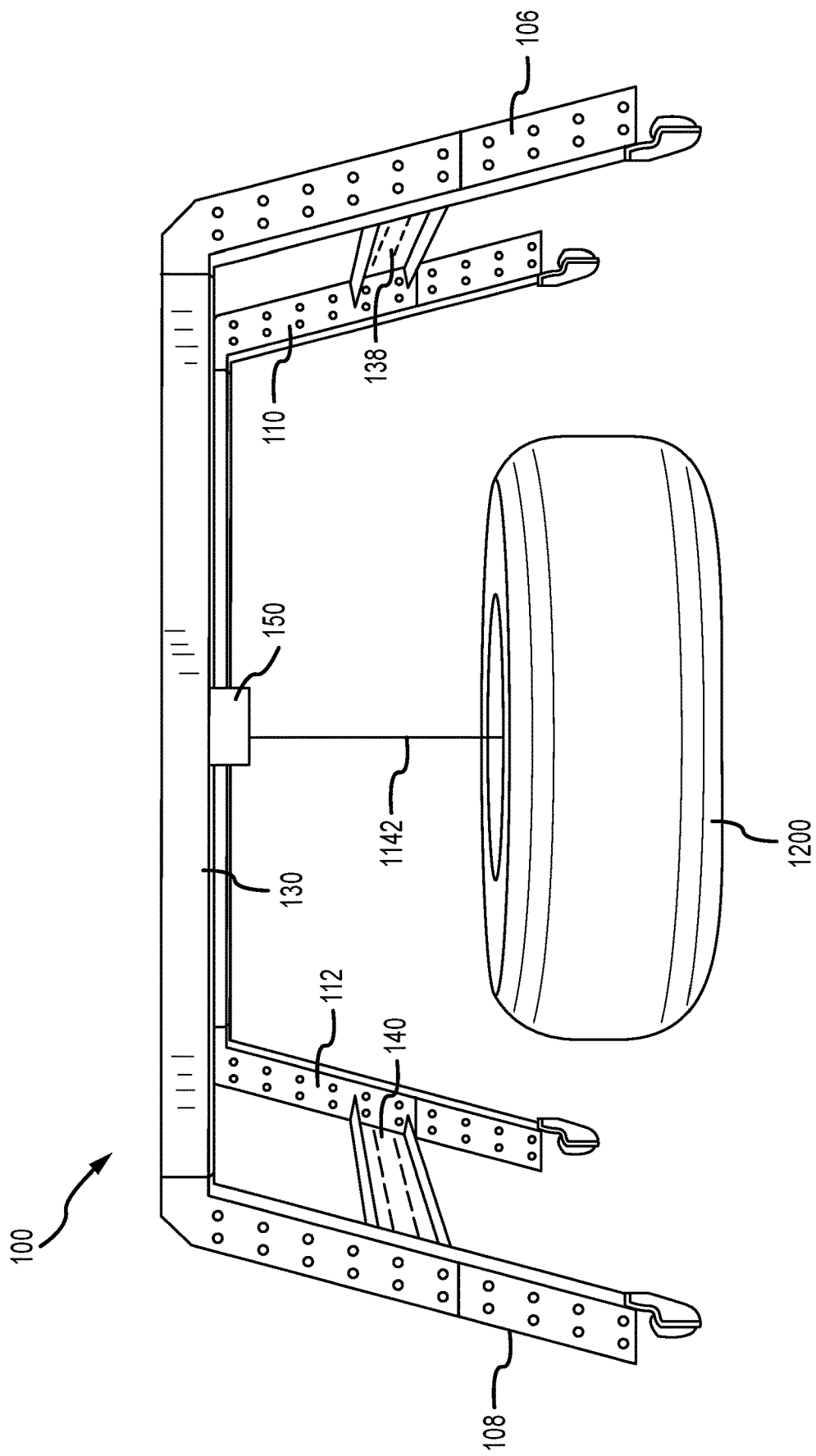
FIG. 13 is a front view of a reconfigurable truck bed rack with a tire hoist accessory in accordance with one embodiment.
Figure 14:
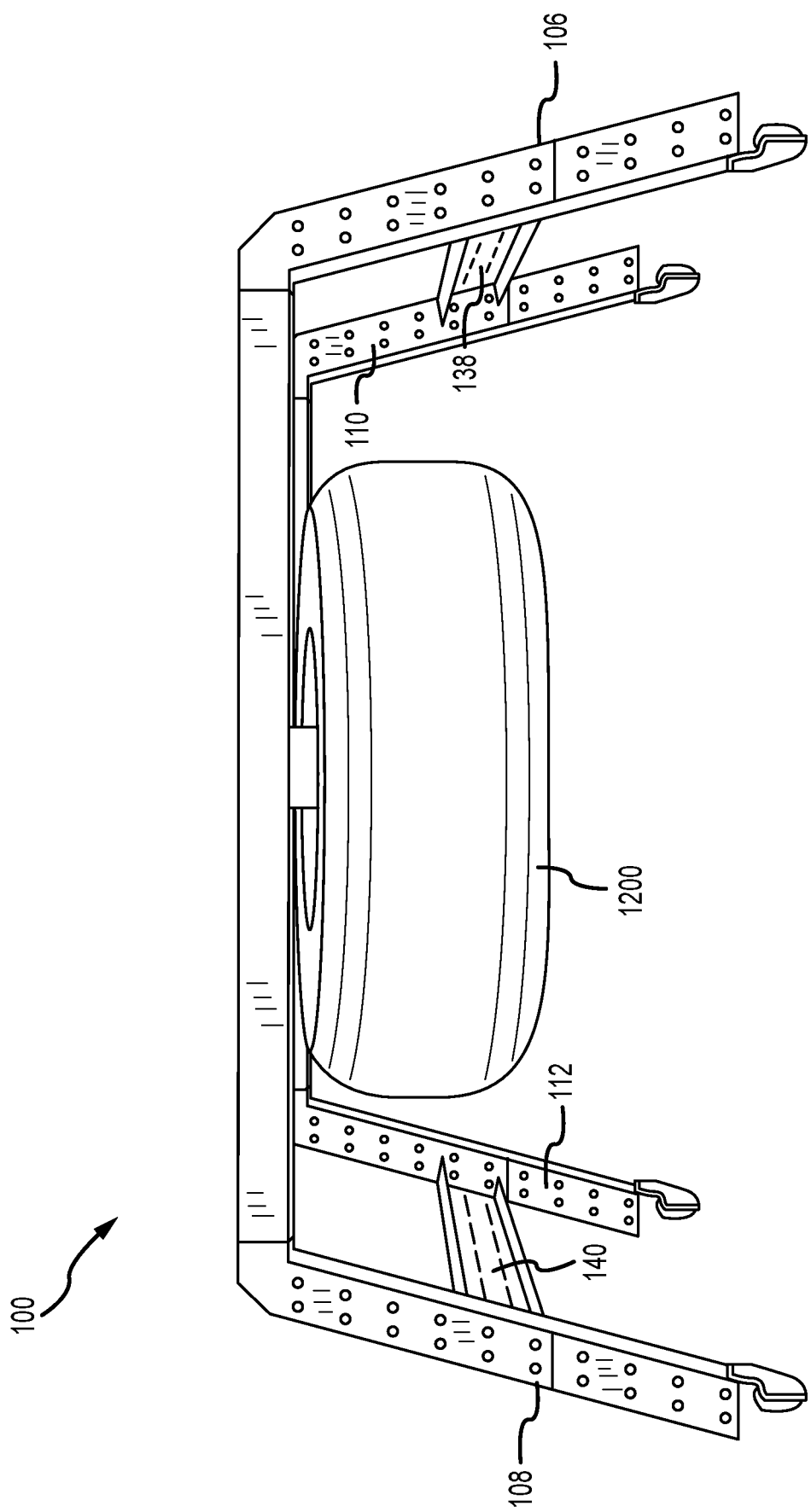
FIG. 14 is a front view of a reconfigurable truck bed rack with a tire hoist accessory and a spare tire in a stored orientation in accordance with one embodiment.

With the tire hoist bracket assembly 150 attached to the bed rack system 100, a spare tire 1200 for the corresponding vehicle to which the rack is attached may be stowed against the rack. In particular, FIGS. 12 and 13 illustrate a reconfigurable truck bed rack with a tire hoist bracket assembly 150 attached to a spare tire 1200. In general, a spoon or other tire attachment device may be located at a lower end of the tire hoist wire or chain 1142. Once the tire 1200 is secured to the hoist wire or chain 1142 via the spoon, the hoist device 1144 may be activated to lift the spare tire 1200 and rest against the underside of the upper rails 146, 148 and/or cross rails 130, 132 of the rack system 100, as seen best in FIG. 14. Activation of the hoist device 1144 to lift the spare tire 1200 may be performed through a rotation of the crank 1146 extending through the housing wall and under the upper surface 1106 of the first tire hoist mounting bracket 1102 or the upper surface 1118 of the second tire hoist mounting bracket 1104. Such rotation may occur through a mechanical or manual rotation of the crank 1146. In this manner, through the tire hoist bracket assembly 150, a spare tire 1200 may stored against the underside of the bed rack system 100. Storage of the spare tire 1200 of a vehicle in this manner may provide additional clearance space for operation of the vehicle, including freeing up space beneath the vehicle (where spare tires are typically stored) or in the bed of a truck.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:
1. A vehicle bed frame comprising:
   a plurality of support structures, each of the plurality of support structures including a pair of upright posts, each of the pair of upright posts having a mounting end, a connecting end opposite the mounting end, and a cross rail extending between the pair of upright posts;

a plurality of side rails connecting the plurality of support structures on opposite sides of the plurality of support structures, each of the plurality of side rails including a plurality of horizontally-elongated apertures extending end to end across a substantial portion of each of the plurality of side rails;

at least one top rail connecting the plurality of support structures between the plurality of side rails and on a top side of the plurality of support structures;

a spare tire hoist housing secured between the plurality of support structures, the spare tire hoist housing having a bottom surface and a side surface, the bottom surface having a keyhole-shaped hoist wire access opening, the side surface having a rotatable hoist crank access opening; and a spare tire hoist secured within the spare tire hoist housing, the spare tire hoist including a rotatable hoist crank extending from the rotatable hoist crank access opening and operable to control a hoist cable extending from the keyhole-shaped hoist wire access opening so that, when the hoist cable is connected to a spare tire, the rotatable hoist crank is operable to be rotated to cause the spare tire to be raised or lowered between a lowered configuration and a stored configuration, the stored configuration with the spare tire suspended against an upper, inner surface of the vehicle bed frame.

2. The vehicle bed frame of claim 1, further comprising:
a plurality of mounting brackets, each of the plurality of mounting brackets extending from a corresponding mounting end of the plurality of support structures, the vehicle bed frame operable to be attached to a vehicle via the plurality of mounting brackets.

3. The vehicle bed frame of claim 2, wherein each of the plurality of mounting brackets include a bed mounting rail operable to engage a truck bed rail system of the vehicle.

4. The vehicle bed frame of claim 1, further comprising:
a plurality of equipment mounting brackets extending from the plurality of side rails, the plurality of equipment mounting brackets operable to maintain a corresponding equipment device to the plurality of side rails.

5. The vehicle bed frame of claim 1,
wherein,
the at least one top rail is a plurality of top rails, and
the plurality of top rails connect the plurality of support structures.

6. The vehicle bed frame of claim 1, wherein the plurality of side rails includes an upper side rail extending from the connecting end of one of the plurality of support structures to the connecting end of another one of the plurality of support structures.

7. The vehicle bed frame of claim 6, wherein the plurality of side rails includes a lower side rail extending from the mounting end of the one of the plurality of support structures to the mounting end of the another one of the plurality of support structures.

8. The vehicle bed frame of claim 1,
wherein,
the rotatable hoist crank extends toward one of the plurality of side rails and terminates on an inner side of the one of the plurality of side rails, and
the rotatable hoist crank is substantially exposed along a length beyond the rotatable hoist crank access opening and at least an underside thereof.

9. A method to store a spare tire above a bed of a vehicle via a vehicle bed frame system, the method comprising:
attaching the vehicle bed frame system to the vehicle, the vehicle bed frame system including:
a plurality of support structures, each of the plurality of support structures including a pair of upright posts, each of the pair of upright posts having a mounting end, a connecting end opposite the mounting end, and a cross rail extending between the pair of upright posts;
a plurality of side rails connecting the plurality of support structures on opposite sides of the plurality of support structures, each of the plurality of side rails including a plurality of horizontally-elongated apertures extending end to end across a substantial portion of each of the plurality of side rails;
at least one top rail connecting the plurality of support structures between the plurality of side rails and on a top side of the plurality of support structures; and
a spare tire hoist secured between the plurality of support structures, the spare tire hoist including a rotatable hoist crank operable to control a hoist cable so that, when the hoist cable is connected to the spare tire, the rotatable hoist crank is operable to be rotated to cause the spare tire to be raised or lowered between a lowered configuration and a stored configuration, the stored configuration with the spare tire suspended against an upper, inner surface of the vehicle bed frame system;
connecting the hoist cable to the spare tire; and
rotating the rotatable hoist crank to cause the spare tire to be raised from the lowered configuration to the stored configuration with the spare tire suspended against the upper, inner surface of the vehicle bed frame system,
wherein,
the rotatable hoist crank extends toward one of the plurality of side rails, beyond a rotatable hoist crank access opening, and is substantially exposed along a length thereof from at least an underside thereof.

10. The method of claim 9,
wherein,
the vehicle bed frame system includes a plurality of mounting brackets,
each of the plurality of mounting brackets extend from a corresponding mounting end of the plurality of support structures, and
the vehicle bed frame system is attached to the vehicle via the plurality of mounting brackets.

11. The method of claim 10, wherein each of the plurality of mounting brackets include a bed mounting rail operable to engage a truck bed rail system of the vehicle.

12. The method of claim 9,
wherein,
the vehicle bed frame system includes a plurality of equipment mounting brackets extending from the plurality of side rails, and
the plurality of equipment mounting brackets is operable to maintain a corresponding equipment device to the plurality of side rails.

13. The method of claim 9,
wherein,
the at least one top rail is a plurality of top rails, and
the plurality of top rails connect the plurality of support structures.

14. The method of claim 9, wherein the plurality of side rails includes an upper side rail extending from the connecting end of one of the plurality of support structures to the connecting end of another one of the plurality of support structures.

15. The method of claim 9, wherein the plurality of side rails includes a lower side rail extending from the mounting end of the one of the plurality of support structures to the mounting end of the another one of the plurality of support structures.

* * * * *